US012613254B2

(12) United States Patent
Okamoto et al.

(10) Patent No.: US 12,613,254 B2
(45) Date of Patent: Apr. 28, 2026

(54) AUTOMATIC ANALYZING APPARATUS AND CONTROL METHOD FOR AUTOMATIC ANALYZING APPARATUS

(71) Applicant: CANON MEDICAL SYSTEMS CORPORATION, Tochigi (JP)

(72) Inventors: Mitsuo Okamoto, Nasushiobara (JP); Yoshitaka Izawa, Kawasaki (JP); Masaaki Iwasaki, Kawasaki (JP)

(73) Assignee: CANON MEDICAL SYSTEMS CORPORATION, Tochigi (JP)

( * ) Notice: Subject to any disclaimer, the term of this patent is extended or adjusted under 35 U.S.C. 154(b) by 734 days.

(21) Appl. No.: 17/822,624

(22) Filed: Aug. 26, 2022

(65) Prior Publication Data

US 2023/0067196 A1 Mar. 2, 2023

(30) Foreign Application Priority Data

Aug. 27, 2021 (JP) ................................. 2021-138692

(51) Int. Cl.
 *G01N 35/10* (2006.01)
 *G01N 35/00* (2006.01)
(52) U.S. Cl.
 CPC ... *G01N 35/1079* (2013.01); *G01N 35/00732* (2013.01); *G01N 2035/00801* (2013.01)
(58) Field of Classification Search
 CPC ......... G01N 35/1079; G01N 35/00732; G01N 2035/00801; G01N 2035/00277; G01N 2035/1025; G01N 2035/1048
 See application file for complete search history.

(56) References Cited

U.S. PATENT DOCUMENTS

| | | | |
|---|---|---|---|
| 9,625,482 B2 | 4/2017 | Yamada et al. | |
| 11,333,675 B2 | 5/2022 | Yamada et al. | |
| 2005/0074363 A1* | 4/2005 | Dunfee | G01N 35/1079 |
| | | | 422/81 |
| 2014/0178251 A1 | 6/2014 | Yamada et al. | |
| 2017/0176485 A1 | 6/2017 | Yamada et al. | |
| 2019/0265265 A1 | 8/2019 | Yamada et al. | |
| 2021/0181224 A1* | 6/2021 | Onoki | G01N 35/1002 |

FOREIGN PATENT DOCUMENTS

| | | | |
|---|---|---|---|
| CN | 103229059 A | 7/2013 | |
| JP | 2007-531869 A | 11/2007 | |
| JP | 2014-122852 A | 7/2014 | |
| JP | 2021-92509 A | 6/2021 | |
| WO | WO-2011095798 A1 * | 8/2011 | ......... G01N 35/1079 |

OTHER PUBLICATIONS

Japanese Office Action issued Jan. 15, 2025 in Japanese Patent Application No. 2021-138692, 4 pages.
Combined Chinese Office Action and Search Report issued Sep. 13, 2025 in Chinese Patent Application No. 202211031852.8, 8 pages.
Office Action issued Jan. 20, 2026, in Chinese Patent Application No. 202211031852.8.

* cited by examiner

*Primary Examiner* — John McGuirk
(74) *Attorney, Agent, or Firm* — Oblon, McClelland, Maier & Neustadt, L.L.P.

(57) ABSTRACT

An automatic analyzing apparatus according to the present embodiment includes a specimen container, a piercer, a detector, and processing circuitry. The specimen container is a container in which a specimen is housed, an opening of the specimen container being sealed by a cap. The piercer pierces the cap by a distal end. The detector detects a blot on the cap. The processing circuitry controls a piercing operation of the piercer.

5 Claims, 7 Drawing Sheets

THERE IS BLOT ON CAP.

REMOVE BLOT.

AUTOMATIC ANALYZING APPARATUS AND CONTROL METHOD FOR AUTOMATIC ANALYZING APPARATUS

CROSS-REFERENCE TO RELATED APPLICATIONS

This application is based upon and claims the benefit of priority from Japanese Patent Application No. 2021-138692, filed on Aug. 27, 2021; the entire contents of which are incorporated herein by reference.

FIELD

Embodiments described herein relate generally to an automatic analyzing apparatus and a control method for the automatic analyzing apparatus.

BACKGROUND

In analyzing blood collected from a subject as a sample by an automatic analyzing apparatus, for example, used is a scheme of sampling the sample housed in a sample container while a plug (hereinafter, referred to as a cap) is kept attached to a blood collection tube as the sample container. In this scheme, used is a piercer as a needle-shaped tube the inside of which is hollow. For example, when a hole is made on the cap by the piercer, a sampling probe moves in the piercer to reach the inside of the sample container, and aspirates the sample in the sample container.

In this case, at the time of collecting blood from the subject, the blood may remain on an upper surface of the cap sealing an opening of the sample container. When the blood remains on the upper surface of the cap, the remaining blood may coagulate to be a blood clot in some cases. Herein, when a hole is made on the cap by the piercer, the piercer may make the blood clot on the cap fall into the sample container. In this case, the blood clot fallen into the sample container is mixed in the sample, so that examination may be affected, and the automatic analyzing apparatus cannot obtain a correct measurement result in some cases.

DETAILED DESCRIPTION

An automatic analyzing apparatus according to the present embodiment includes a specimen container, a piercer, a detector, and processing circuitry. The specimen container is a container in which a specimen is housed, and an opening of the specimen container is sealed by a cap. The piercer pierces the cap by its distal end. The detector detects a blot on the cap. The processing circuitry controls a piercing operation of the piercer.

The following describes an embodiment of the automatic analyzing apparatus and a control method for the automatic analyzing apparatus in detail with reference to the drawings. The embodiment is not limited to the embodiment described below. Content described in one embodiment is basically applied to another embodiment.

Figure 1:
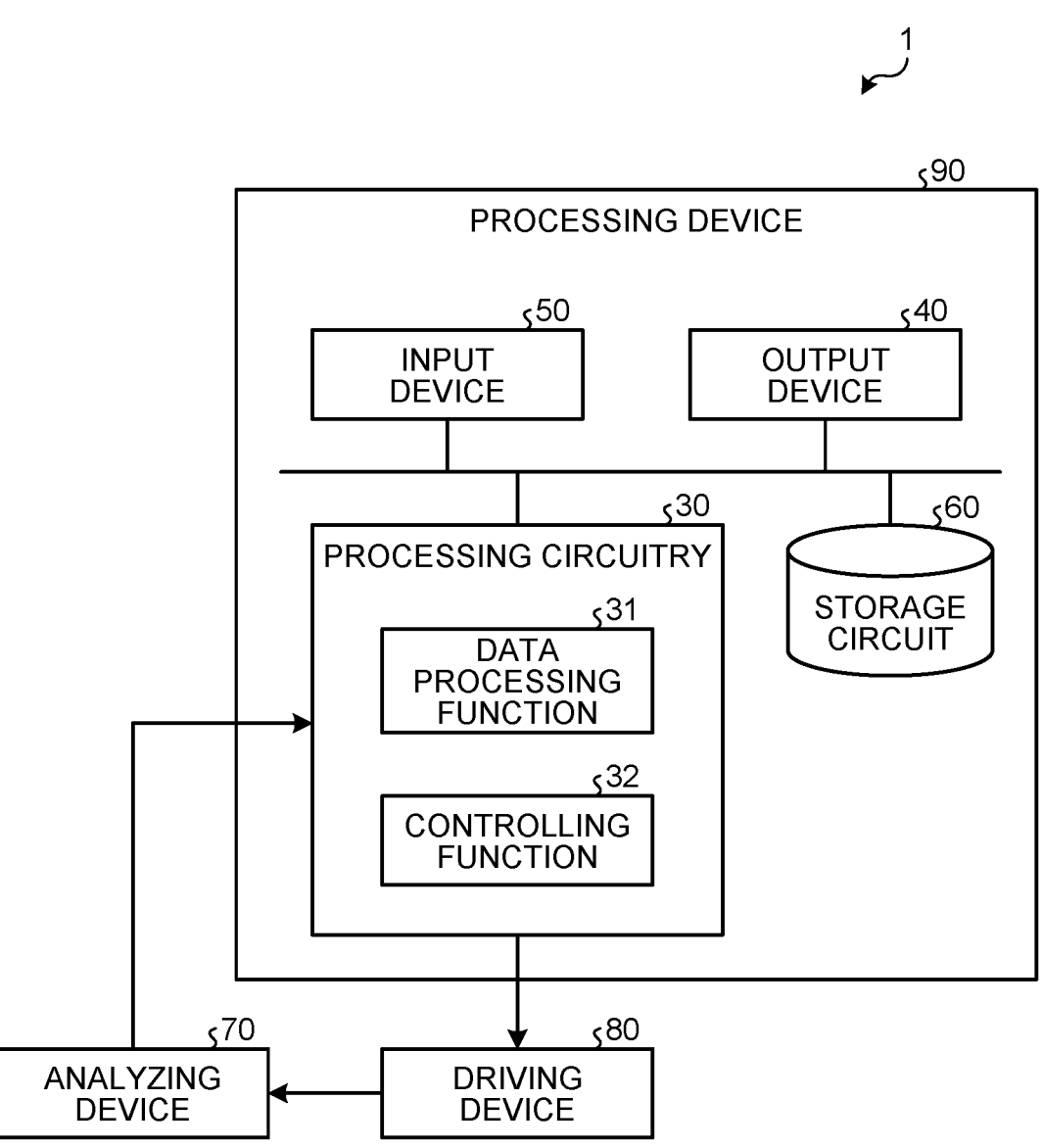
FIG. 1 is a block diagram illustrating an example of a configuration of an automatic analyzing apparatus according to an embodiment.

FIG. 1 is a block diagram illustrating an example of a configuration of an automatic analyzing apparatus 1 according to the present embodiment. The automatic analyzing apparatus 1 illustrated in FIG. 1 includes an analyzing device 70, a driving device 80, and a processing device 90.

The analyzing device 70 measures a mixed liquid of a reagent used for analysis of each examination item and a standard sample of each examination item or a test sample taken from a subject (biological sample such as blood and urine), and generates standard data or test data. The analyzing device 70 includes a plurality of units that perform dispensing of a sample, dispensing of a reagent, and the like. The driving device 80 drives the respective units of the analyzing device 70. The processing device 90 controls the driving device 80 to allow the respective units of the analyzing device 70 to operate.

The processing device 90 includes an input device 50, an output device 40, processing circuitry 30, and a storage circuitry 60.

The input device 50 includes input devices such as a keyboard, a mouse, a button, and a touch key panel, and performs input for setting an analysis parameter for each examination item, input for setting test identification information of a test sample and an examination item, and the like.

The output device 40 includes a printer and a display. The printer performs printing of data generated by the processing circuitry 30. The display is a monitor such as a cathode ray tube (CRT) or a liquid crystal panel, and displays data generated by the processing circuitry 30.

The storage circuitry 60 is, for example, a semiconductor memory element such as a random access memory (RAM) and a flash memory, or a storage device such as a hard disk and an optical disc.

The processing circuitry 30 controls the entire system. For example, as illustrated in FIG. 1, the processing circuitry 30 executes a data processing function 31 and a controlling function 32. The controlling function 32 controls the driving device 80 to allow the respective units of the analyzing device 70 to operate. The data processing function 31 processes standard data or test data generated by the analyzing device 70, and generates calibration data or analysis data of each examination item.

For example, the standard data generated by the analyzing device 70 represents data for determining a coagulation time or an iron amount of blood by examining a test sample (blood), and the test data generated by the analyzing device 70 represents data of results obtained by performing measurement of the coagulation time of blood or colorimetric measurement. The calibration data output from the processing circuitry 30 represents data of measurement results such as the coagulation time or the iron amount of blood derived from the test data and the standard data, and the analysis data output from the processing circuitry 30 represents data of determination results of presence/absence of a morbid state. That is, the calibration data is data for deriving analysis data representing the determination result of presence/absence of a morbid state.

For example, each of processing functions executed by a constituent element of the processing circuitry 30 is recorded in the storage circuitry 60 as a computer-executable program. The processing circuitry 30 is a processor that reads out, from the storage circuitry 60, and executes each computer program to implement a function corresponding to the computer program. In other words, the processing circuitry 30 that has read out each computer program is assumed to have each function illustrated in the processing circuitry 30 of FIG. 1.

In FIG. 1, each processing function described below is assumed to be implemented by a single piece of the processing circuitry 30. Alternatively, the processing circuitry may be configured by combining a plurality of independent processors, and each of the processors may execute a computer program to implement a function.

A word of "processor" used in the above description means, for example, a circuit such as a central processing unit (CPU), a graphics processing unit (GPU), an application specific integrated circuit (ASIC), and a programmable logic device (for example, a simple programmable logic device (SPLD), a complex programmable logic device (CPLD), and a field programmable gate array (FPGA)). In a case in which the processor is a CPU, for example, the processor implements a function by reading out and executing a computer program stored in the storage circuitry 60. On the other hand, in a case in which the processor is an ASIC, for example, the computer program is directly incorporated in a circuit of the processor instead of storing the computer program in the storage circuitry 60. Each of the processors according to the present embodiment is not necessarily configured as a single circuit, but a plurality of independent circuits may be combined and configured as one processor to implement a function thereof. Furthermore, a plurality of constituent elements in FIG. 1 may be integrated into one processor to implement a function thereof.

The following describes a configuration of the analyzing device 70 in the automatic analyzing apparatus 1 according to the present embodiment. For example, the automatic analyzing apparatus 1 analyzes a test sample (blood) including an examination item of blood coagulation. Specifically, the automatic analyzing apparatus 1 performs colorimetric measurement or coagulation time measurement for blood collected from the subject.

The analyzing device 70 includes a reaction cuvette table, a reagent storage, a sampling probe, a reagent dispensing probe, and a photometry part (not illustrated).

The reaction cuvette table is a reaction chamber, and holds a plurality of reaction cuvettes disposed on a circumference in a rotatable manner.

The reagent storage holds a plurality of reagent vessels disposed on the circumference while keeping them cool. Each of the reagent vessels in the reagent storage houses a reagent containing a component that reacts with a component of each examination item contained in the sample (hereinafter, referred to as a sample). The reagent storage includes a turntable that holds the reagent vessel of each examination item in a rotatable manner.

The sampling probe dispenses the sample in the sample container that is moved to a sampling position. Specifically, the sampling probe aspirates the sample in the sample container positioned at the sample position for each examination item, and dispenses the sample the amount of which is set as an analysis parameter for the examination item into the reaction cuvette positioned at a sample dispense position in the reaction cuvette table. The sampling probe is cleaned thereafter.

The reagent dispensing probe dispenses the reagent in the reagent vessel that has been moved to a reagent aspirating position. Specifically, the reagent dispensing probe aspirates the reagent in the reagent vessel positioned at the reagent aspirating position, and dispenses the reagent the amount of which is set as the analysis parameter for the examination item into the reaction cuvette positioned at the reagent dispense position in the reaction cuvette table. The reagent dispensing probe is cleaned thereafter.

The photometry part measures the mixed liquid by applying light to the reaction cuvette housing the mixed liquid of the reagent and the sample in the reaction cuvette. Specifically, the photometry part applies light to the reaction cuvette that is rotating at a measurement position, and detects light, transmitted through the mixed liquid of the sample and the reagent in the reaction cuvette, due to the application of light. The measuring part 9 then processes a detected signal to generate standard data or test data represented by a digital signal, and outputs the standard data or the test data to the processing circuitry 30 of the processing device 90. The reaction cuvette is cleaned thereafter.

For example, in the present embodiment, Closed Tube Sampling (CTS) is employed. The CTS is, for example, a scheme of sampling the sample housed in the sample container while the cap is kept attached to the blood collection tube as the sample container in analyzing blood collected from the subject (examinee) as the sample.

In the CTS, used is a piercer as a needle-shaped tube the inside of which is hollow. For example, when a hole is made on the cap by the piercer (when the cap is pierced), the sampling probe moves inside the piercer in an axial direction of the piercer to reach the inside of the sample container, and aspirates the sample in the sample container.

In this case, at the time when blood is collected from the subject, that is, at the time of blood collection, the blood may remain on an upper surface of the cap sealing the opening of the sample container.

For example, at the time of blood collection, a health professional such as a nurse mounts the blood collection tube (sample container) into a blood collection tube holder to which a blood collection needle is attached (or connected to the blood collection needle via a tube). At this point, a needle disposed in the blood collection tube holder passes through the cap sealing the upper surface of the sample container. An air pressure inside the sample container is a negative pressure corresponding to a prescribed blood collection amount before blood collection. By using a pressure difference between the air pressure and a venous pressure of the subject, the blood of the subject flows into the sample container from the blood collection needle attached to the blood collection tube holder through the needle in the blood collection tube holder. At the time when the health professional removes the sample container from the blood collection tube holder after ending blood collection, the blood (sample) leaked out from the needle in the blood collection tube holder may adhere to the upper surface of the cap.

In a case in which the blood remains on the upper surface of the cap, the remaining blood may coagulate to be a blood clot in some cases. Herein, when a hole is made on the cap by the piercer, the piercer may make the blood clot on the cap fall into the sample container. In this case, the blood clot fallen into the sample container is mixed in the sample, so that examination may be affected, and the automatic analyzing apparatus cannot obtain a correct measurement result in some cases.

Specifically, by using a centrifugal separator, the blood flowed into the sample container is typically separated into a blood serum not containing a blood cell component and a blood clot containing the blood cell component if they are used for biochemical examination. Similarly, the blood is separated into blood plasma not containing the blood cell component and the blood cell component if they are used for coagulation examination. In this case, the blood serum or the blood plasma presents in an upper layer in the sample container. Herein, in a case in which a hole is made on the cap by the piercer and the piercer makes the blood clot on the cap fall into the sample container, the blood cell component may enter the blood serum or the blood plasma present in the upper layer in the sample container again, and the automatic analyzing apparatus cannot obtain a correct measurement result in some cases.

Thus, in the present embodiment, the automatic analyzing apparatus 1 is configured as described below so as to improve reliability of the automatic analyzing apparatus 1. The automatic analyzing apparatus 1 according to the present embodiment includes the specimen container, the piercer, the detector, and the controlling function 32. The specimen container is a container in which a specimen is housed, and the opening of the container is sealed by the cap. The piercer pierces the cap by its distal end. The detector detects a blot on the cap. The controlling function 32 controls a piercing operation of the piercer.

The following describes the configuration of the automatic analyzing apparatus 1 according to the present embodiment described above in detail with reference to FIG. 2A to FIG. 2D.

Figure 2A:
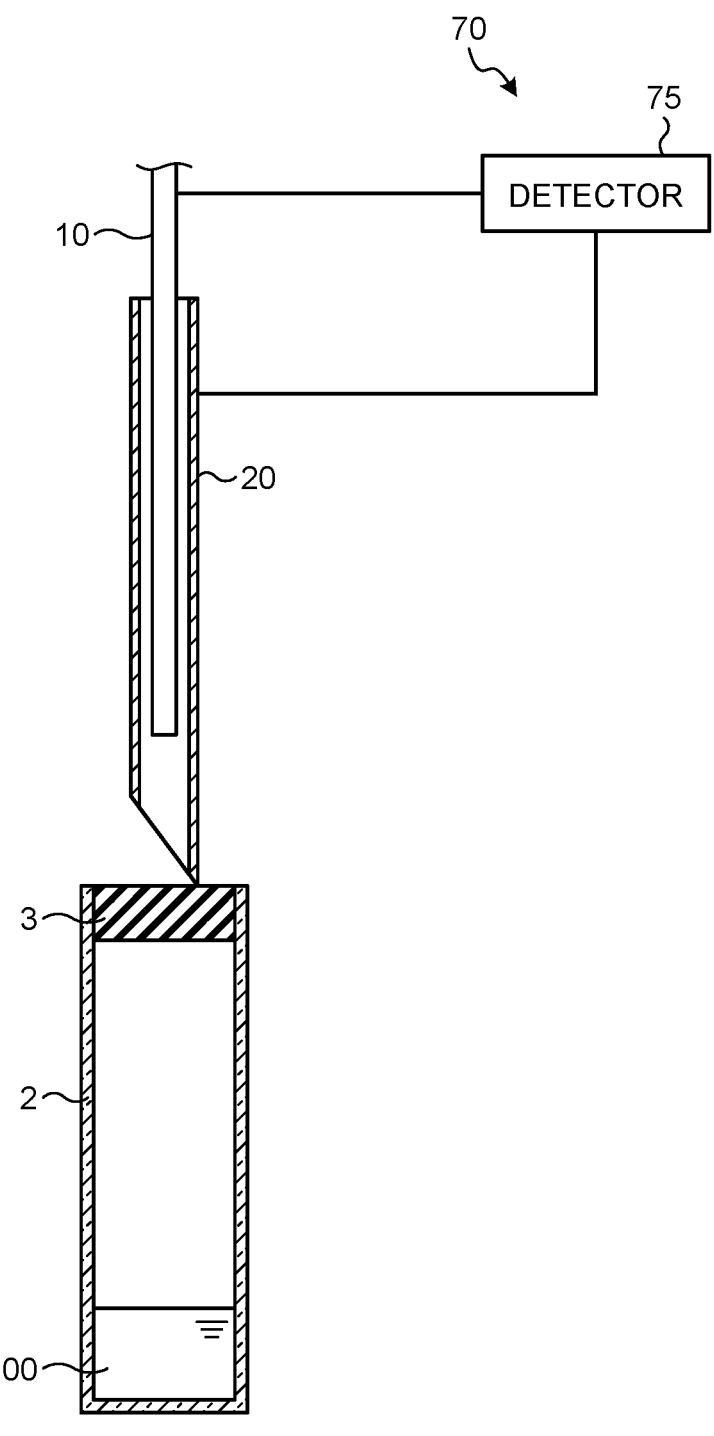
FIG. 2A is an explanatory diagram of processing from piercing to sampling as processing performed by the automatic analyzing apparatus according to the present embodiment.

As illustrated in FIG. 2A, the analyzing device 70 further includes a sample container 2, a sampling probe 10, a cap 3, a piercer 20, and a detector 75.

The sample container 2 is the sample container described above. For example, the sample container 2 houses a sample 100 that is blood collected from the subject. An opening of the sample container 2 is sealed by the cap 3. The cap 3 is constituted of a cap main body and a part to be pierced. The cap main body is, for example, a rigid body made of plastic. The part to be pierced is, for example, an elastic body such as rubber fitted into a center part of the cap main body. The sample container 2 is an example of the specimen container, and the specimen is an example of the sample.

The piercer 20 is a needle-shaped tube the inside of which is hollow. Specifically, the piercer 20 is a cylindrical-shaped member the distal end part of which is opened and obliquely processed to be pointed.

The sampling probe 10 is the sampling probe described above. The sampling probe 10 can move inside the piercer 20 in an axial direction of the piercer 20. Processing performed by the detector 75 will be described later.

Figure 2B:
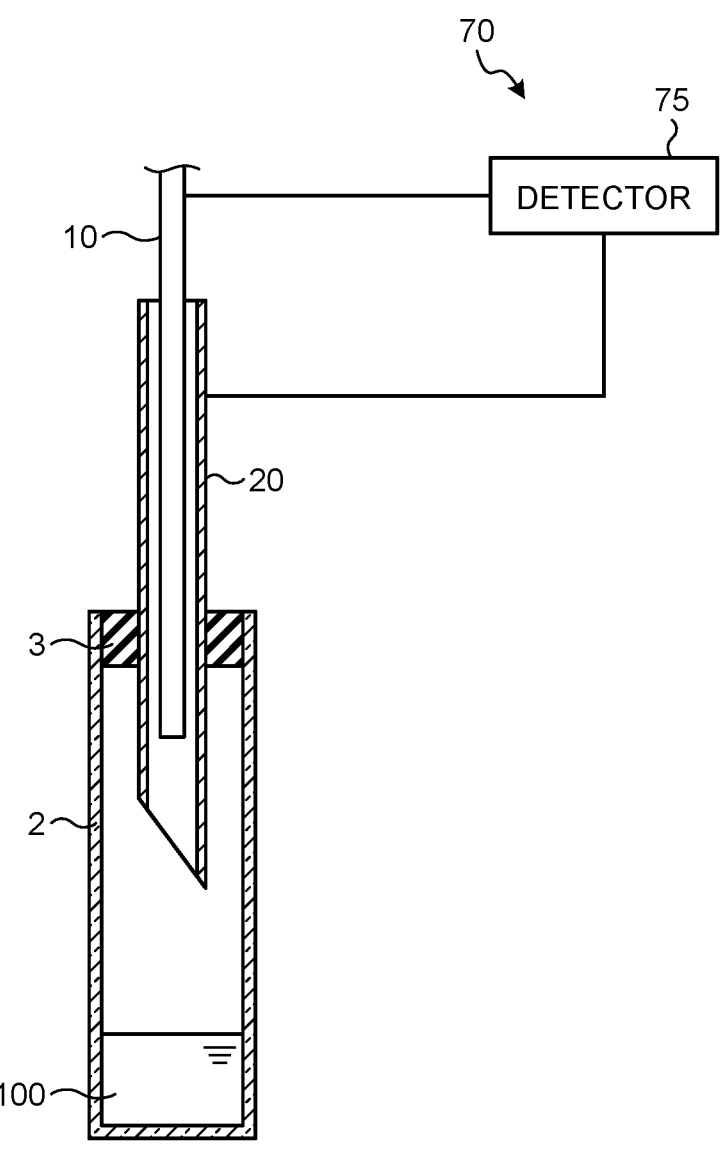
FIG. 2B is an explanatory diagram of processing from piercing to sampling as processing performed by the automatic analyzing apparatus according to the present embodiment.
Figure 2C:
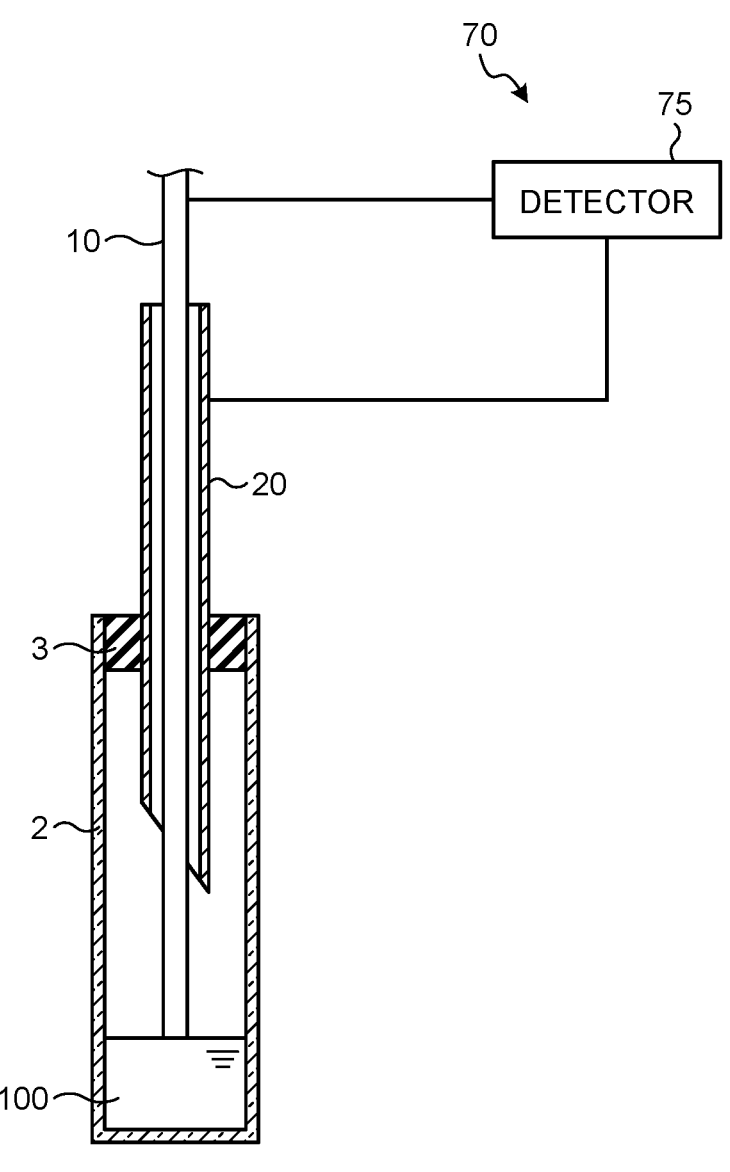
FIG. 2C is an explanatory diagram of processing from piercing to sampling as processing performed by the automatic analyzing apparatus according to the present embodiment.

Next, the following describes a procedure from piercing to sampling according to the present embodiment with reference to FIG. 2A to FIG. 2C.

First, in FIG. 2A, the sample container 2 houses the sample 100 that is blood of the subject, and the opening of the sample container 2 is sealed by the cap 3. When the piercer 20 descends from an upper side of the sample container 2, a distal end part of the piercer 20 is inserted into the part to be pierced of the cap 3 mounted on an upper part of the sample container 2.

Next, when the distal end part of the piercer 20 is inserted into the part to be pierced of the cap 3, the piercer 20 makes a hole on the part to be pierced of the cap 3, and descends while expanding the hole made on the part to be pierced. In FIG. 2B, the piercer 20 then passes through the part to be pierced of the cap 3 and stops.

Next, the sampling probe 10 descends, and moves inside the stopped piercer 20 in the axial direction of the piercer 20. In FIG. 2C, the detector 75 determines that a liquid surface is detected when a distal end part of the sampling probe 10 descended from an upper side of the liquid surface becomes close to or is brought into contact with the liquid surface of the sample 100 in the sample container 2. The sampling probe 10 aspirates the sample 100 in the sample container 2 for each examination item, and dispenses the sample 100 the amount of which is set as an analysis parameter for the examination item into the reaction cuvette.

Specifically, the detector 75 is electrically connected to the sampling probe 10, and detects the liquid surface based on a change in capacitance that is allowed when the distal end part of the sampling probe 10 becomes close to or is brought into contact with the liquid surface in the sample container 2. When the liquid surface in the sample container 2 is detected, the sampling probe 10 aspirates the sample 100 in the sample container 2, and dispenses the aspirated sample 100 into the reaction cuvette.

Figure 3A:
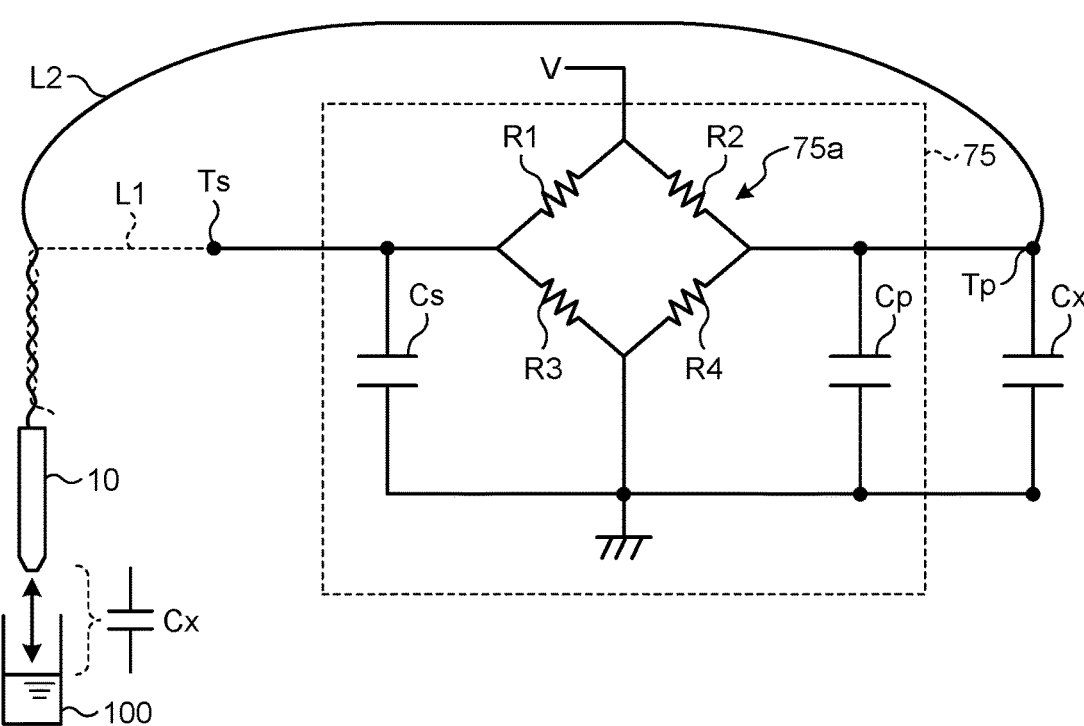
FIG. 3A is a diagram illustrating an example of a configuration of a detector of the automatic analyzing apparatus according to the present embodiment.

For example, as illustrated in FIG. 3A, the detector 75 includes liquid surface detection circuitry 75*a* for detecting the liquid surface of the sample 100 in the sample container 2 based on a change in capacitance. Specifically, the liquid surface detection circuitry 75*a* includes a bridge circuit constituted of four resistance elements, that is, resistance elements R1 to R4. In the bridge circuit, a sine wave voltage V is applied to a terminal connecting the resistance element R1 to the resistance element R2, and a terminal connecting the resistance element R3 to the resistance element R4 is connected to the ground. A capacitive element Cs is connected between a terminal connecting the resistance element R1 to the resistance element R3 (hereinafter, referred to as a shield terminal Ts) and the ground, and a capacitive element Cp is connected between a terminal connecting the resistance element R2 to the resistance element R4 (hereinafter, referred to as a probe terminal Tp) and the ground. Lead wires L1 and L2 twisted with each other are respectively connected to the shield terminal Ts and the probe terminal Tp. The lead wire L1 floats, and is connected to a floating ground, for example. The sampling probe 10 is connected to the lead wire L2.

Capacitors Cs and Cp have stay capacitance allowed by routing of the lead wires L1 and L2. However, the lead wires L1 and L2 are twisted with each other, so that changes in capacitance depending on an environment can be canceled by routing of the lead wires L1 and L2 and the like, and a dynamic range of the liquid surface detection circuitry 75a can be increased. The liquid surface detection circuitry 75a outputs a change in a variable capacitor Cx as an output signal from the probe terminal Tp. That is, the probe terminal Tp connected to the sampling probe 10 via the lead wire L2 is used as an output terminal of the liquid surface detection circuitry 75a. For example, the liquid surface detection circuitry 75a outputs, as an output signal, a change in capacitance between capacitance at the time when the distal end part of the sampling probe 10 becomes close to or is brought into contact with the sample 100 (liquid surface in the sample container 2) and capacitance at the time when the distal end part of the sampling probe 10 does not become close to or is not brought into contact with the sample 100 from the probe terminal Tp. The detector 75 then detects the sample 100 in accordance with the output signal output from the liquid surface detection circuitry 75a.

In this way, by electrically connecting the liquid surface detection circuitry 75a of the detector 75 to the sampling probe 10, the liquid surface detection circuitry 75a detects the liquid surface in the sample container 2 using the sampling probe 10. Herein, by electrically connecting the liquid surface detection circuitry 75a of the detector 75 to the piercer 20, the liquid surface detection circuitry 75a can detect the liquid surface using the piercer 20. That is, the detector 75 can perform liquid surface detection using the sampling probe 10 or the piercer 20, with the one liquid surface detection circuitry 75a.

Figure 3B:
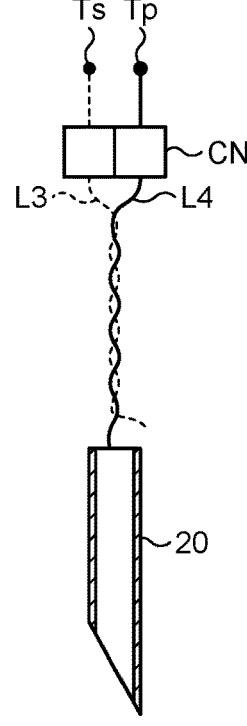
FIG. 3B is a diagram illustrating an example of the configuration of the detector of the automatic analyzing apparatus according to the present embodiment.

The following describes liquid surface detection by using the piercer 20. For example, the liquid surface detection circuitry 75a of the detector 75 is electrically connected to the piercer 20. Specifically, as illustrated in FIG. 3B, in the liquid surface detection circuitry 75a, lead wires L3 and L4 twisted with each other are connected to a connector CN, and the lead wires L1 and L2 described above are respectively connected to the lead wires L3 and L4 via the connector CN. In this case, the lead wire L3 is connected to the floating ground. The piercer 20 is connected to the lead wire L4. That is, in the detector 75, the lead wire L2 connected to the sampling probe 10 and the lead wire L4 connected to the piercer 20 share the probe terminal Tp, and the lead wire L1 and the lead wire L3 share the shield terminal Ts, so that the piercer 20 and the sampling probe 10 have the same electric potential.

Therefore, even in a case of using the piercer 20, similarly to the case of using the sampling probe 10, the liquid surface detection circuitry 75a outputs a change in the variable capacitor Cx as an output signal from the probe terminal Tp. That is, the probe terminal Tp connected to the piercer 20 via the lead wire L4 and the connector CN is used as an output terminal of the liquid surface detection circuitry 75a. For example, in the detector 75, the liquid surface detection circuitry 75a outputs, as an output signal, a change in capacitance between capacitance at the time when the distal end part of the piercer 20 becomes close to or is brought into contact with the liquid surface and capacitance at the time when the distal end part of the piercer 20 does not become close to or is not brought into contact with the liquid surface from the probe terminal Tp. The detector 75 then detects the liquid surface in accordance with the output signal output from the liquid surface detection circuitry 75a.

Figure 2D:
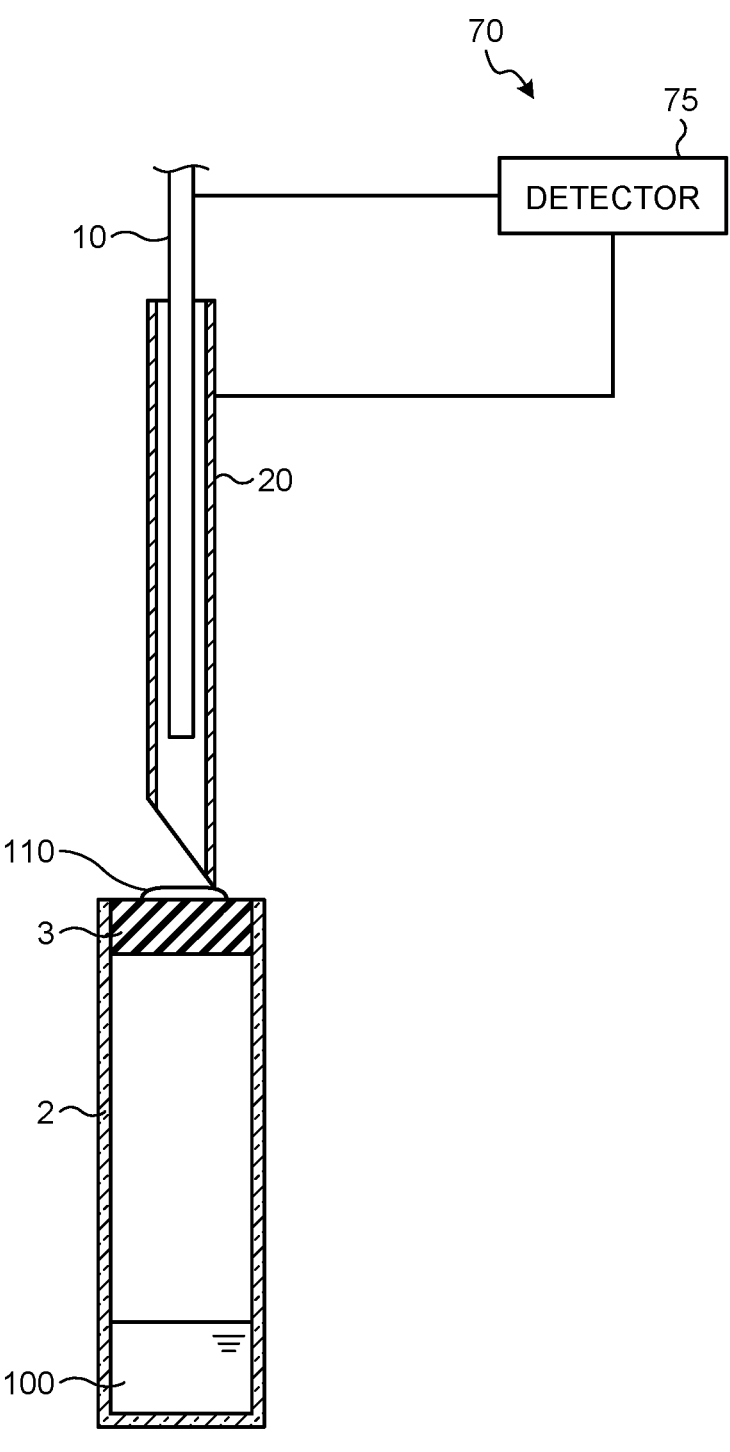
FIG. 2D is an explanatory diagram of detection processing using a piercer as processing performed by the automatic analyzing apparatus according to the present embodiment.

Herein, in FIG. 2D, the sample container 2 houses the sample 100 that is the blood of the subject, and the opening of the sample container 2 is sealed by the cap 3. A blot 110 may adhere to the upper surface of the cap 3 in some cases. Examples of the blot 110 include a residual sample that is the sample 100 remaining on the upper surface of the cap 3, and another specimen or solution adhering to the upper surface of the cap 3 other than the residual sample. For example, in a case of the residual sample, the residual sample (blood) coagulates to be a blood clot. Thus, in the present embodiment, by electrically connecting the liquid surface detection circuitry 75a of the detector 75 to the piercer 20, the detector 75 can detect the blot 110 based on a change in capacitance at the time when the distal end part of the piercer 20 becomes close to or is brought into contact with the blot 110 on the cap 3.

In the present embodiment, by causing the piercer 20 and the sampling probe 10 to have the same electric potential, the detector 75 can detect the blot 110 on the cap 3 using the piercer 20 as the liquid surface detection, and prevents erroneous detection as follows from being allowed. For example, assuming an event in which the distal end part of the sampling probe 10 is brought into contact with an inner wall of the piercer 20, the detector 75 may erroneously detect the inner wall of the piercer 20 as the liquid surface in the sample container 2 based on a change in capacitance at the time when the distal end part of the sampling probe 10 is brought into contact with the inner wall of the piercer 20. Thus, in the present embodiment, the piercer 20 and the sampling probe 10 have the same electric potential, so that the detector 75 does not erroneously detect the inner wall of the piercer 20 as the liquid surface in the sample container 2 if the sampling probe 10 is brought into contact with the inner wall of the piercer 20. In this way, the detector 75 can perform liquid surface detection using the piercer 20, and prevent the erroneous detection described above from being allowed.

In a case of detecting the blot 110 on the cap 3, the detector 75 notifies a user of the fact that the blot 110 is detected by outputting the fact to the output device 40. For example, the detector 75 allows a display to display information of prompting the user to remove the blot 110 on the cap 3. The user removes the blot 110 on the cap 3 in accordance with the notification of the information, and sets the sample container 2 to the automatic analyzing apparatus 1 so that the sample 100 is dispensed by the sample container 2 from which the blot 110 is removed.

In this way, according to the present embodiment, by notifying the user of the fact that the detector 75 has detected the blot 110, piercing on the cap 3 can be stopped before the piercer 20 pierces the cap 3 to which the blot 110 adheres. Therefore, the blot 110 can be prevented from falling into the sample container 2.

Figures 4, 5:
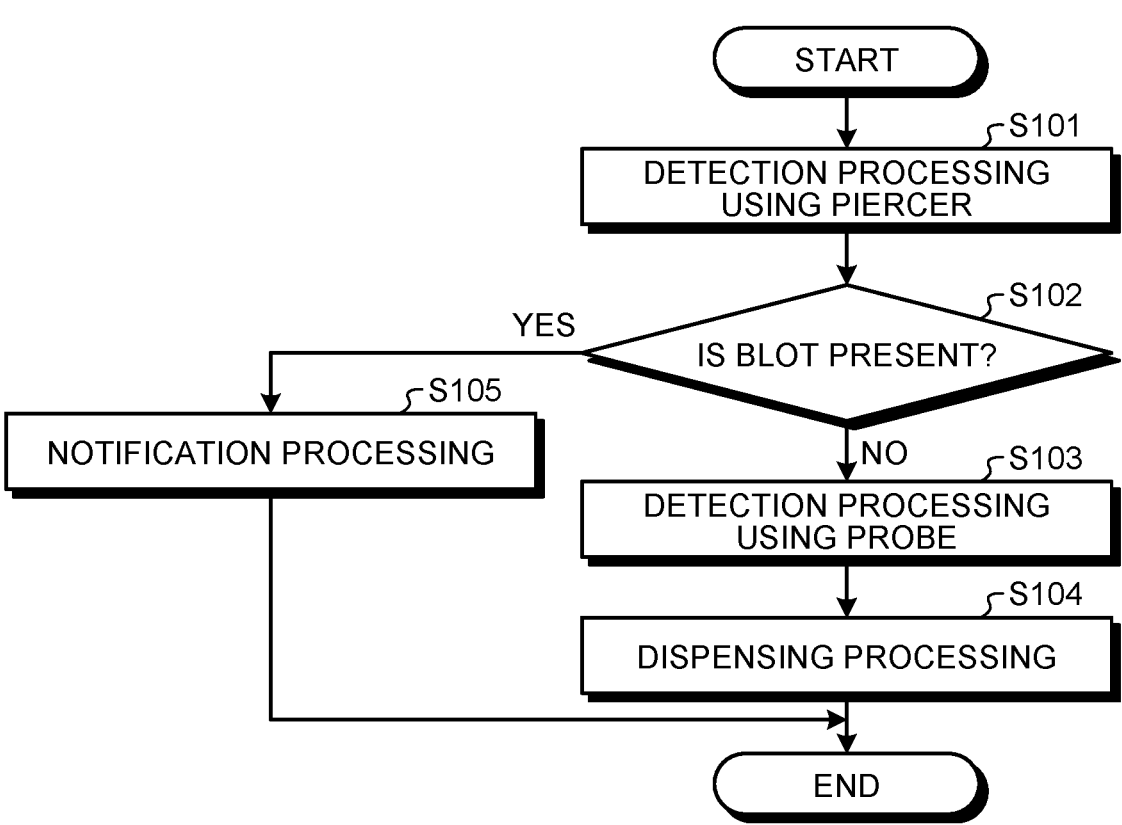
FIG. 4 is a flowchart illustrating a processing procedure from piercing to sampling as a processing procedure performed by the automatic analyzing apparatus according to the present embodiment (a control method for the automatic analyzing apparatus)
FIG. 5 is a diagram illustrating a screen example in notification processing performed by the automatic analyzing apparatus according to the present embodiment.

Next, the following describes a procedure of sample dispensing as processing performed by the automatic analyzing apparatus 1 according to the present embodiment (control method for the automatic analyzing apparatus 1) with reference to FIG. 4.

FIG. 4 is a flowchart illustrating a processing procedure of the automatic analyzing apparatus 1 according to the present embodiment.

At Step S101 in FIG. 4, the controlling function 32 of the processing device 90 controls the driving device 80, and the driving device 80 allows the analyzing device 70 to perform detection processing using the piercer 20 under the control by the controlling function 32. That is, the controlling function 32 controls the piercing operation of the piercer 20. In this case, the driving device 80 allows the piercer 20 to descend from an upper side of the sample container 2 under the control by the controlling function 32.

At this point, at Step S102 in FIG. 4, the controlling function 32 of the processing device 90 controls the driving device 80, and the driving device 80 allows the detector 75 to detect whether the blot 110 is present on the cap 3 under the control by the controlling function 32. In this case, the detector 75 detects the blot 110 based on a change in capacitance at the time when the distal end part of the piercer 20 becomes close to or is brought into contact with the blot 110 on the cap 3. If a detection result obtained by the detector 75 represents that the blot 110 is not present on the cap 3 (No at Step S102), Step S103 (described later) is performed. On the other hand, the detection result obtained by the detector 75 represents that the blot 110 is present on the cap 3 (Yes at Step S102), Step S105 (described later) is performed.

At Step S103 in FIG. 4, the controlling function 32 of the processing device 90 controls the driving device 80, and the driving device 80 allows the analyzing device 70 to perform detection processing using the sampling probe 10 under the control by the controlling function 32. That is, the controlling function 32 controls the piercing operation of the piercer 20. In this case, the driving device 80 allows the piercer 20 to descend under the control by the controlling function 32, and inserts the distal end part of the piercer 20 into the part to be pierced of the cap 3 mounted on the upper part of the sample container 2 to make a hole on the part to be pierced of the cap 3. Furthermore, the driving device 80 allows the piercer 20 to descend while expanding the hole made on the part to be pierced, and stops the piercer 20 when the piercer 20 passes through the part to be pierced of the cap 3. At this point, the driving device 80 allows the sampling probe 10 to descend to move inside the stopped piercer 20 in the axial direction of the piercer 20. The driving device 80 then allows the detector 75 to detect whether the distal end part of the sampling probe 10 is in contact with the liquid surface in the sample container 2 under the control by the controlling function 32. In this case, the detector 75 detects the liquid surface based on a change in capacitance at the time when the distal end part of the sampling probe 10 becomes close to or is brought into contact with the liquid surface in the sample container 2. In a case in which the detector 75 detects the liquid surface, Step S104 (described later) is performed.

At Step S104 in FIG. 4, the controlling function 32 of the processing device 90 controls the driving device 80, and the driving device 80 allows the analyzing device 70 to perform dispensing processing under the control by the controlling function 32. In this case, the driving device 80 allows the sampling probe 10 to descend, and allows the sampling probe 10 to aspirate the sample 100 in the sample container 2 and dispense the aspirated sample 100 into the reaction cuvette.

On the other hand, in a case in which the blot 110 is present on the upper surface of the cap 3, at Step S105 in FIG. 4, the controlling function 32 of the processing device 90 controls the piercing operation of the piercer 20 and performs notification processing.

First, at Step S105, in a case in which the detector 75 detects the blot 110, the controlling function 32 controls the driving device 80 to stop the piercing operation of the piercer 20. The driving device 80 allows the piercer 20 to ascend under the control by the controlling function 32.

At Step S105, in a case in which the detector 75 detects the blot 110, the controlling function 32 notifies the user of the fact that the blot 110 is detected as the notification processing. For example, as illustrated in FIG. 5, the controlling function 32 allows the display to display a screen 200 indicating that "There is a blot on the cap. Remove the blot." as the information for prompting the user to remove the blot 110 on the cap 3. In this way, according to the present embodiment, by notifying the user of the fact that the detector 75 has detected the blot 110, piercing on the cap 3 can be stopped before the piercer 20 pierces the cap 3 to which the blot 110 adheres. Therefore, the blot 110 can be prevented from falling into the sample container 2.

At Step S105, during stoppage of the piercing operation, the input device 50 may receive a piercing instruction from the user in some cases. For example, when receiving the notification that the blot 110 is detected, the user removes the blot 110 adhering to the cap 3. After removing the blot 110 on the cap 3, the user then gives a piercing instruction using the input device 50. In this case, the input device 50 receives the piercing instruction from the user. The controlling function 32 allows the stopped piercing operation to be resumed in accordance with the piercing instruction received by the input device 50. In this case, Step S101 described above is performed, the controlling function 32 controls the piercing operation of the piercer 20, and the driving device 80 allows the piercer 20 to descend from the upper side of the sample container 2 under the control by the controlling function 32.

As described above, in the automatic analyzing apparatus 1 according to the present embodiment, the sample container 2 is a container that houses the sample 100, the opening of the container being sealed by the cap 3, the piercer 20 pierces the cap 3 by the distal end part thereof, the detector 75 detects the blot 110 on the cap 3, and the controlling function 32 controls the piercing operation of the piercer. In the present embodiment, in a case of detecting the blot 110, the sample 100 is dispensed by the sample container 2 from which the blot 110 is removed by the user. Thus, with the automatic analyzing apparatus 1 according to the present embodiment, a correct measurement result can be obtained at the time of measuring the mixed liquid of the reagent and the sample 100 in the reaction cuvette. That is, according to the present embodiment, reliability of the automatic analyzing apparatus 100 can be improved.

According to at least one embodiment described above, reliability of the automatic analyzing apparatus can be improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An automatic analyzing apparatus comprising:
   a probe;
   a specimen container that houses a specimen, an opening of the specimen container being sealed by a cap;
   a piercer configured to pierce the cap by a distal end part;
   a detector configured to detect a blot on the cap; and
   processing circuitry configured to control a piercing operation of the piercer, wherein
   the detector is electrically connected to the piercer, and is configured to detect the blot based on a change in capacitance between a distal end part of the piercer and the blot on the cap,
   the probe is configured to move inside the piercer in an axial direction of the piercer, and aspirate the specimen housed in the specimen container, the detector is electrically connected to the probe, and is configured to detect a liquid surface based on a change in capacitance between the distal end part of the probe and the liquid surface in the specimen container, and the piercer and the probe have a same electric potential.

2. The automatic analyzing apparatus according to claim 1, wherein the blot is the specimen that has adhered to the cap.

3. The automatic analyzing apparatus according to claim 1, wherein the processing circuitry is configured to notify that the blot is detected in a case in which the detector detects the blot.

4. The automatic analyzing apparatus according to claim 1, wherein the processing circuitry is configured to stop the piercing operation in a case in which the detector detects the blot.

5. The automatic analyzing apparatus according to claim 4, further comprising an input device configured to receive a piercing instruction from a user during stoppage of the piercing operation, wherein the processing circuitry is configured to allow the stopped piercing operation to be resumed in accordance with the piercing instruction.

\*    \*    \*    \*    \*